UNITED STATES PATENT OFFICE.

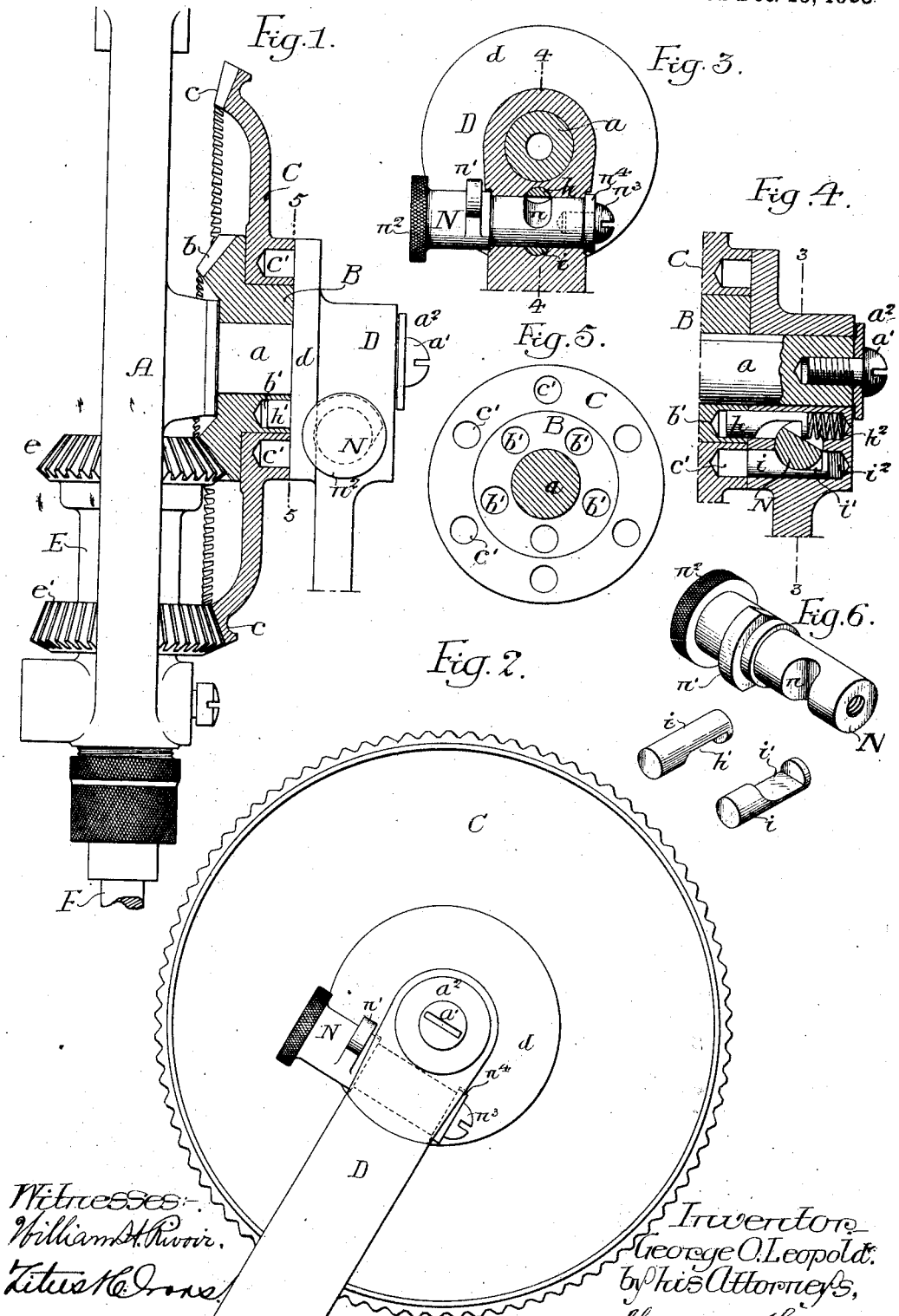

GEORGE O. LEOPOLD, OF PHILADELPHIA, PENNSYLVANIA, ASSIGNOR TO NORTH BROS. M'F'G CO., OF PHILADELPHIA, PENNSYLVANIA, A CORPORATION OF PENNSYLVANIA.

SPEED-CHANGE GEAR.

No. 906,902.     Specification of Letters Patent.     Patented Dec. 15, 1908.

Application filed January 22, 1908. Serial No. 412,149.

*To all whom it may concern:*

Be it known that I, GEORGE O. LEOPOLD, a citizen of the United States, residing in Philadelphia, Pennsylvania, have invented certain Improvements in Speed-Change Gear, of which the following is a specification.

The object of my invention is to construct a simple and readily adjustable speed change gear for use particularly in connection with hand or power operated tools.

In the accompanying drawing; Figure 1, is a side view, partly in section, of sufficient of a breast drill to illustrate my invention; Fig. 2, is a side view of a portion of the drill; Fig. 3, is a sectional view on the line 3—3, Fig. 4; Fig. 4, is a sectional view on the line 4—4, Fig. 3; Fig. 5, is a sectional view on the line 5—5, Fig. 1 showing the hubs of the two bevel wheels; and Fig. 6, is a detail view showing the two pins and the shifting means.

In the drawing I have shown the invention as applied to a hand breast drill or screw driver in which there are two changes of speed.

A is the frame of a breast drill having a stud $a$ on which is mounted the small bevel gear wheel B; on the hub of this wheel, in the present instance, is mounted the bevel gear wheel C and on the end of the stud $a$ is a handle D held in place by a screw $a'$ and washer $a^2$.

E is a sleeve connected to the stem F and has two bevel gears $e$ and $e'$, in the present instance; the bevel gear wheel $e$ meshing with the teeth $b$ of the gear B and gear wheel $e'$ meshing with the teeth $c$ of the gear C, as clearly indicated in Fig. 1. It will be understood that these gears may be modified considerably without departing from my invention as the invention relates solely to the mechanism for locking either one of the gears C and B with the handle D or other driving part.

In the hub of the gear wheel B is a series of holes $b'$ and in the hub of the gear wheel C is a series of holes $c'$; the holes of each series being a given distance from the center of the stud $a$.

Mounted in cavities in the handle section D are two pins $h$ and $i$ notched at $h'$ and $i'$, respectively, as shown in Fig. 6, and back of the pin $h$ is a spring $h^2$ and back of the pin $i$ is a spring $i^2$. In order to withdraw one of these pins and allow the other to project into one of the holes in the gears, I provide an operating spindle N recessed at $n$ forming a cam which releases one pin when in one position and retains the other pin in its withdrawn position, as shown in Fig. 4; and when turned in the opposite direction it will withdraw the first mentioned pin and release the other pin.

On the operating spindle is an enlargement $n'$ which forms a stop to limit the movement of the spindle in either direction, the stop coming in contact with the flange $d$ of the handle section D. In the present instance the spindle has a knurled handhold $n^2$ at one end and is held in position by a screw $n^3$ and washer $n^4$ at the opposite end, as shown in Fig. 3.

The operation is as follows:—If, for instance, it is desired to turn the drill stem at a high speed then the spindle N is turned so as to release the pin $i$ and withdraw the pin $h$, and the pin as the handle turns will be forced into the first hole $c'$ of the gear wheel C by the spring $i^2$, locking the handle firmly to the gear wheel C which meshes with the gear $e'$ on the sleeve E, driving the stem F at high speed. If it is desired to drive the stem at low speed then the spindle N is reversed, withdrawing the pin $i$ and allowing the pin $h$ to be forced into one of the holes $b'$ in the gear wheel B which meshes with the gear $e$ of the sleeve E as shown in Fig. 4.

This construction makes a very compact and simple device for changing the speed particularly of a hand operated tool, such as a breast drill and other tools of this type, although it can be used for any purpose where it is desired to connect one moving part with other moving parts; these parts being either the driven or the driving means.

I claim:

1. The combination of two hubs one mounted outside the other and each having a hole or holes therein, a third hub extending over the ends of the two hubs, two pins carried by said third hub and respectively capable of entering said holes, with means for withdrawing either pin and allowing the other pin to be projected into one of the holes.

2. The combination of a stud, a hub mounted on the stud and a second hub mounted on the first mentioned hub, each hub having a hole therein, a driving member also mounted on the stud, two pins carried by said driving member, and means for projecting one pin into a hole in one hub and withdrawing the other pin from the hole in the other hub.

3. The combination of a stud, two hubs one mounted on the stud and the other mounted on the first mentioned hub, each hub having a hole therein, a driving member also mounted on the stud and having two cavities one alining with the hole in the one hub and the other alining with the hole in the other hub, a notched pin in each cavity, and a transverse spindle mounted in the driving member and recessed to form a cam adapted to act upon the pins, so that when one is withdrawn the other is released to enter the hole in one of the hubs.

4. The combination of two hubs one mounted upon the other and both carried by a stud, each hub having a hole therein, a driving member also mounted on the stud, two pins carried by the driving member, one pin adapted to enter the hole in one hub and the other pin adapted to enter the hole in the other hub, a transverse operating spindle recessed to form a cam for withdrawing one pin and allowing the other to be projected, and a stop on the spindle to limit the movement thereof.

5. The combination of a frame having a stud, a bevel gear wheel mounted on the stud and having a hub with a series of holes therein, a second gear wheel mounted on the hub of the first mentioned gear wheel and having a series of holes in its hub, a spindle, pinions thereon meshing with both of said gear wheels, a driving handle mounted on the stud and having two cavities therein, a pin in each cavity, one pin alining with the holes in one hub and the other pin alining with the holes in the other hub, and an operating spindle, whereby one pin is withdrawn and the other pin allowed to be projected so as to enter a hole in one of the hubs.

In testimony whereof, I have signed my name to this specification, in the presence of two subscribing witnesses.

GEORGE O. LEOPOLD.

Witnesses:
 Wm. E. Shupe,
 Wm. A. Barr.